Feb. 20, 1934.  J. P. MAHONEY  1,947,914
BRAKE CONNECTION
Filed Sept. 22, 1930
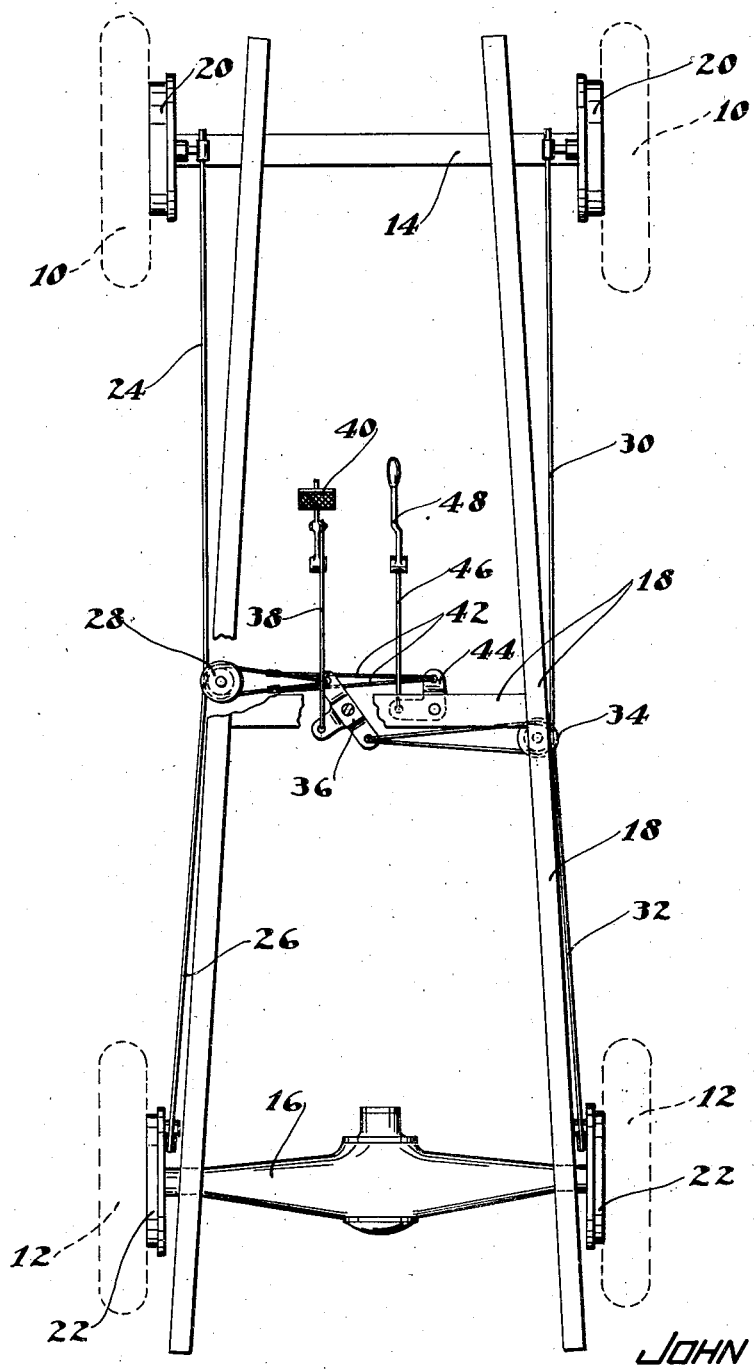
INVENTOR.
JOHN P. MAHONEY
BY
M. W. McConkey
ATTORNEY Patented Feb. 20, 1934

1,947,914

UNITED STATES PATENT OFFICE 1,947,914

BRAKE CONNECTION

John P. Mahoney, South Bend, Ind., assignor to Bendix Brake Company, South Bend, Ind., a corporation of Illinois Application September 22, 1930
Serial No. 483,728

3 Claims. (Cl. 188—106)

This invention relates to operating means for brakes or the like, and is illustrated as embodied in an automobile chassis having a set of four-wheel brakes. An object of the invention is to provide a simple and inexpensive system of operating connections for the brakes, by a novel arrangement of cables which preferably operate the brakes without equalization.

In the arrangement illustrated in the drawing, the right and left pairs of cables, passed over suitable right and left direction-changing elements if desired, are all brought together and connected to a single central lever operated by the driver, for example by being connected to the usual service brake pedal. I prefer to connect at least two of the cables independently to an auxiliary operating device such as the usual emergency lever.

The above and other objects and features of the invention, including various novel and desirable structural details, will be apparent from the following description of the illustrative embodiment shown in the accompanying drawing, in which:

The figure is a top plan view of the above-described chassis.

The illustrated chassis includes the usual front and rear road wheels 10 and 12, and front and rear axles 14 and 16, together with a suitable chassis frame 18. The wheels are provided with front and rear brakes 20 and 22.

According to the present invention, the brakes are operated by a novel and simplified system of connections, shown as including a pair of front and rear left cables or equivalent flexible elements 24 and 26 passing over a left-hand pulley or other direction-changing element 28, and a pair of similar right-hand front and rear cables 30 and 32 passing over a right-hand element 34.

The two left-hand cables are connected to one arm, and the two right-hand cables are connected to another arm, of a three-arm lever 36 pivotally fulcrumed on a cross member of the chassis frame, and the third arm of which may be connected by means such as a rod or cable 38 to the service pedal 40.

I prefer to connect cables 24 and 26, independently of lever 36, by means such as auxiliary cables 42 secured thereto, to auxiliary operating means such as a bellcrank lever 44 pivoted on the frame cross member and connected by means such as a rod or cable 46 to the usual emergency lever 48. Lever 48 may have the usual pawl-and-ratchet (not shown) to hold the two left-hand brakes applied when the car is left parked.

While one illustrative embodiment has been described in detail, it is not my intention to limit the scope of the invention to that particular embodiment, or otherwise than by the terms of the appended claims.

I claim:

1. A chassis having front brakes and rear brakes, a pedal-operated lever having one arm with a pair of cables connecting it to the left front and left rear brakes and having another arm with a pair of cables connecting it to the right front and right rear brakes, an auxiliary lever, and a pair of auxiliary cables independently connecting said auxiliary lever to two of said first mentioned cables at points intermediate the pedal operated lever and the brakes.

2. A chassis having front brakes and rear brakes, a pedal-operated lever having one arm with a pair of cables connecting it to the left front and left rear brakes and having another arm with a pair of cables connecting it to the right front and right rear brakes, and an auxiliary lever independently connected to one of said pairs of cables.

3. A chassis having a plurality of brakes, right and left direction changing elements at the sides of the chassis, a driver operated lever positioned between said elements, a foot pedal, connections from the foot pedal to the driver operated lever, cables connected to said lever and passing about said elements and connected respectively to the brakes, a bell crank lever, a plurality of tension elements connected to one arm of said bell crank lever and each connected to one of said cables, and a hand lever connected to the other arm of said bell crank lever.

JOHN P. MAHONEY.